United States Patent Office

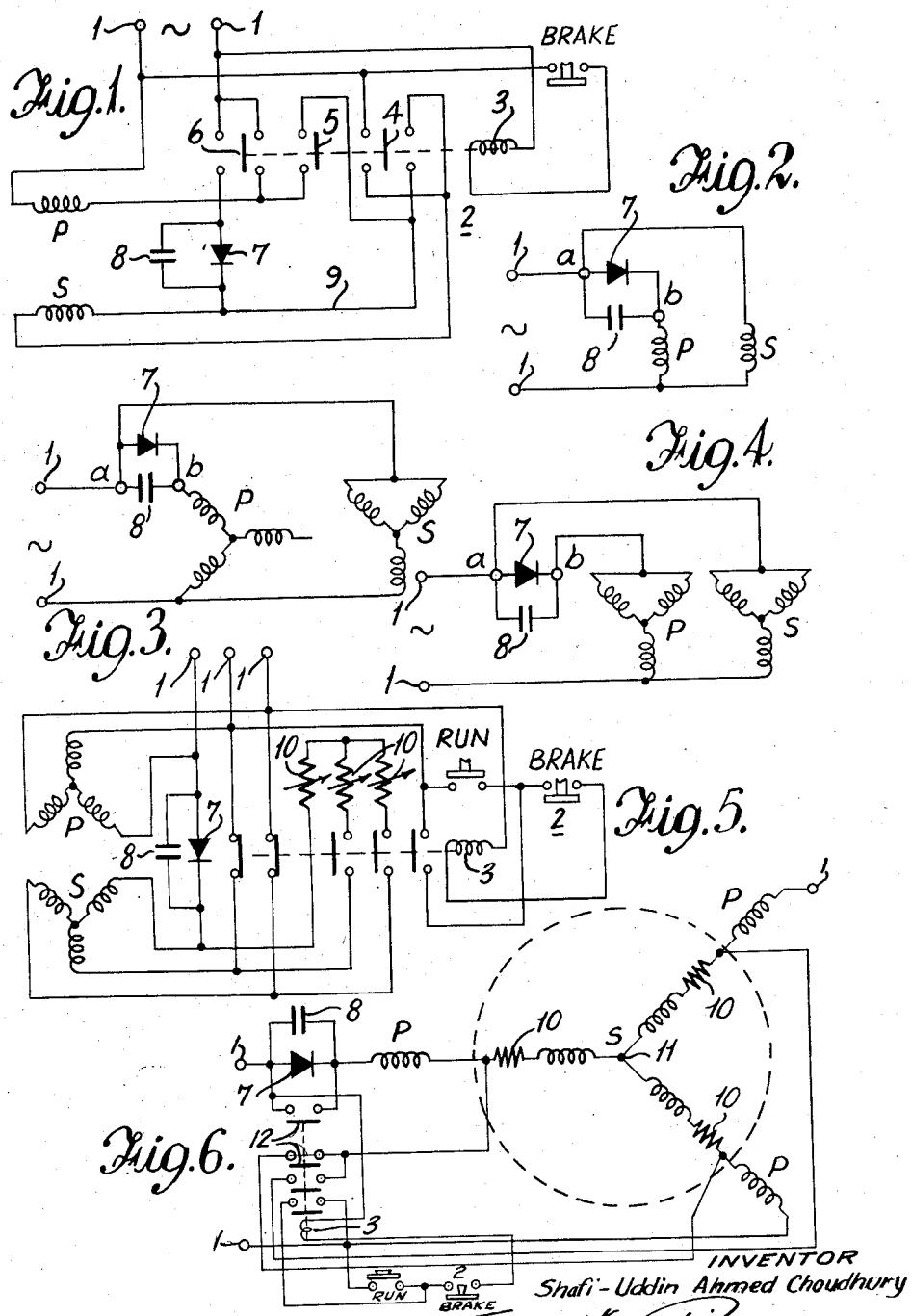

2,858,494
Patented Oct. 28, 1958

2,858,494

DYNAMIC BRAKING OF DYNAMO ELECTRIC MACHINES

Shafi-Uddin Ahmed Choudhury, Rugby, England, assignor to The British Thomson-Houston Company Limited, London, England, a British company Application May 9, 1957, Serial No. 658,118

Claims priority, application Great Britain May 24, 1956

4 Claims. (Cl. 318—212)

This invention relates to the application of dynamic braking to alternating current motors, and provides an arrangement for dynamic braking which is particularly applicable when it is required to bring the motor to rest in a short period of time.

The present invention is concerned with the application of dynamic braking to A. C. dynamo-electric machines having a wound rotor in addition to a wound stator, in the case where the rotor of the machine is required to come to rest in a definite angular position with relation to the stator.

According to the present invention dynamic braking of an A. C. dynamo-electric machine having a wound rotor is effected by causing unidirectional current to flow in primary winding, the secondary winding, or in both the primary and the secondary winding of the machine whilst the primary and secondary windings are both connected to the supply, by connecting a rectifier in series with the supply, a capacitor being connected across the rectifier for a purpose to be described hereinafter.

In the present case in which the machine has windings on the stator and rotor, the primary windings being connected during normal operation to a source of single-phase supply and the secondary windings being either short-circuited or connected to a resistance, in order to apply dynamic braking in such a motor, the primary and secondary windings may be connected in parallel or in series with one another and to the A. C. supply, a rectifier being included in the connections which permits alternate half-waves of rectified current to flow through the primary and secondary windings of the motor or through either of them. The rectifier is shunted by a capacitor which, when the rotor has come to a standstill, provides an alternating component of current in the windings which locks the rotor in a definite angular position with reference to the stator, and thus limits the current flowing in the windings.

When the motor is provided with a polyphase winding on its stator and rotor, the polyphase windings on the stator being normally connected during running to a source of A. C. supply, many different connections may be adopted for supplying dynamic braking, according to whether the supply is single or polyphase.

In a preferred arrangement the polyphase primary stator and polyphase secondary rotor windings are connected in series with one another and with resistance in each phase of the secondary winding to a star point provided by the rotor windings, the rectifier and the polyphase secondary rotor windings in series with the resistance being short-circuited during normal operation, the short-circuits across the rectifier and the secondary windings and resistance being opened when braking is required.

In the accompanying drawings which illustrate the manner in which the invention can be put into practice, Fig. 1 shows a switching arrangement for a single-phase induction motor in which the rectified current component is supplied to both the primary and secondary windings during braking, Fig. 2 is a modified connection showing how the rectified component can be supplied to the primary windings only during braking, Fig. 3 illustrates a further modification in which polyphase primary and secondary windings are provided on the motor but are supplied from a single-phase supply, Fig. 4 is a modification of Fig. 3, Fig. 5 is an arrangement similar to Fig. 1 but applicable to the case in which the primary and secondary windings of the motor are polyphase and are supplied from a polyphase source, and Fig. 6 is a further modification also applicable to the case in which polyphase primary and secondary windings are employed.

Referring firstly to Fig. 1, the motor is provided with single-phase windings of which P is the primary winding and S the secondary winding. They are supplied from a source of single-phase voltage from terminals 1, the connections of the motor being changed from running to braking by means of a contactor 2 provided with an operating winding 3 and contacts 4, 5 and 6. A rectifier 7, shunted by a capacitor 8 is provided for furnishing a rectified component of current to the primary and secondary windings of the motor in the braking position.

The operating winding 3 of the contactor 2 is connected to the supply terminals 1 through a push-button switch indicated as "Brake."

Contacts 4 of the contactor serve, when the contactor is energized, to short-circuit the secondary winding S of the motor in the running position, whilst contacts 6 similarly connect primary winding P to the supply terminals 1; the motor thus normally runs as an induction motor with a short-circuited secondary winding. When the "Brake" push-button is open, the contactor coil 3 is de-energized and the contacts of the contactor move to their left-hand positions. In this position, contacts 5 and 6 serve to complete a circuit through the rectifier 7 and conductor 9 to energize the primary winding of the motor from the supply terminals 1, whilst contacts 4 and 6 similarly complete a circuit for energizing the secondary winding S from those terminals; the motor is thereby braked to a standstill by virtue of the rectified component of current supplied through rectifier 7 to the primary and secondary windings, both primary and secondary windings being continued to be energized from the supply, the alternating component flowing through capacitor 8.

In the arrangement shown in Fig. 1, the rectified component is supplied to both primary and secondary windings; braking may, however, be effected by supplying the rectified component only to the primary winding. This arrangement is shown in Fig. 2 in which the primary and secondary windings are shown only in the braking position, the rectifier 7 with its shunt capacitor 8 being connected to the primary windings from the supply terminals 1, the secondary winding being connected directly across the supply terminals by connection of its uppermost terminal to the left-hand terminal $a$ of the rectifier. If it is desired to supply a rectified component of current to the secondary winding only, the positions of the upper terminals of the primary and secondary windings are interchanged as regards the terminals $a$ and $b$ of the rectifier, so that the upper terminal of the primary winding is connected to terminal $a$ and the upper terminal of the secondary winding S is connected to terminal $b$.

In the arrangement shown in Fig. 3, which corresponds with that shown in Fig. 2, connections are shown for a motor having polyphase primary and secondary windings which are connected to the single-phase supply. In this case, two phases of the primary winding P are connected to the supply, the remaining phase being open-circuited; whilst the secondary winding has two of its phases short-circuited, as indicated.

In the arrangement shown in Fig. 3, the rectified component of current is supplied only to the primary windings, but by interchange of the connections of the primary and secondary terminals with regard to terminals *a* and *b* (as mentioned above), rectified component of current may be supplied to the secondary winding only. Alternatively, by a change in connections, an arrangement similar to that described in connection with Fig. 1 may be used, in which the rectifier is included in circuit with both the primary and secondary windings.

In the arrangements shown in Fig. 4, a motor having polyphase primary and secondary windings is employed, as in the arrangement of Fig. 3, but the connections of the primary and secondary windings are the same, two of the phases of both primary and the secondary windings being short-circuited. The alternatives suggested in connection with the Fig. 3 arrangement may be adopted also in connection with that disclosed in Fig. 4.

In Fig. 5 we have illustrated a system of connections which may be adapted for the case in which the primary and secondary windings of the induction motor are both polyphase and are supplied from a polyphase source connected to terminals 1. The contactor 2 is connected in the manner illustrated in Fig. 1, and is provided with "Run" and "Brake" push buttons. When the "Run" push button is closed, the contactor coil 3 is energized and the contactors move to their right-hand positions in which the secondary winding is closed upon the resistor 10, which may be of variable value. In this position, the primary winding is connected directly to the supply terminals 1, it being assumed that an additional contactor or switch is utilized to disconnect the supply from the motor when shut-down is desired. On opening the "Brake" push button the contactor coil 3 is de-energized and its contacts move to their left-hand position. In this position a circuit is closed from the supply to two of the phases of the secondary winding and a rectified component of current is supplied to the secondary windings by way of rectifier 7 and shunting capacitor 8.

Referring now to Fig. 6, a modified arrangement is shown in which the polyphase primary and secondary windings of the motor are connected in series with one another to the supply terminals, by way of resistors 10, the secondary windings being connected to a star point 11. During running, contacts 12 of a contactor are all closed, thereby short-circuiting the rectifier 7 and its shunt capacitor 8, and connecting the primary windings to a star point to which the secondary windings are also connected through resistors 10. When braking is desired, contacts 12 are all opened causing a rectified component of current to be supplied through the rectifier 7 to both the primary and secondary windings of the motor, the current in the secondary windings being limited by the resistors 10.

What I claim is:

1. An arrangement for applying dynamic braking to an induction motor having a stator and a rotor on which are wound primary and secondary windings comprising a source of alternating current and circuit means connecting said source to said primary and secondary windings, a rectifier, a capacitor shunting said rectifier, and means for introducing said rectifier and said capacitor into said circuit means so that unidirectional current is caused to flow in at least one of said windings.

2. An arrangement for applying dynamic braking to an induction motor having a stator and a rotor on which are wound polyphase primary and polyphase secondary windings comprising a source of alternating current, means connecting said primary windings and said secondary windings to said source so that alternating current is caused to flow in each phase of said primary and secondary windings and a rectifier shunted by a capacitor in series in one of said connections between said source and one of said phases whereby a unidirectional component of said alternating current is caused to flow in at least one of said primary and secondary windings.

3. An arrangement for operating an induction motor having a stator and a rotor on which are wound polyphase primary and polyphase secondary windings, said secondary windings having a star point, comprising a source of polyphase alternating current, means connecting one terminal of each phase of said polyphase primary windings to said source, one of said connections including a rectifier shunted by a capacitor, a plurality of resistances each having one terminal connected to a terminal of one phase of said primary windings, not connected to said source, the other terminal of said resistance being connected to a terminal of one phase of said secondary winding remote from said star point, a first switching means for shunting said rectifier and said capacitor, further switching means arranged to short-circuit said resistances and said secondary windings, and means for simultaneously operating said first and further switching means whereby in normal operation said resistance and said capacitor are short-circuited and said primary windings are connected between said source and a star-point formed by said further switching means with said secondary windings connected in star with said resistances, whilst for braking said primary and said secondary windings are connected in series to said source with said resistances and said rectifier open-circuited, a direct component of said alternating current appears in said primary and secondary windings.

4. An arrangement as claimed in claim 3, in which the operation of said first and further switching means to change the connections of the motor from operation to braking is effected by a contactor energizable from said source through manually operated switches.

No references cited.